June 22, 1965 M. J. BUZAWA 3,190,176
PHOTOGRAPHIC OBJECTIVE FOR USE IN ENLARGING OR REDUCING DEVICES
Filed Nov. 13, 1962

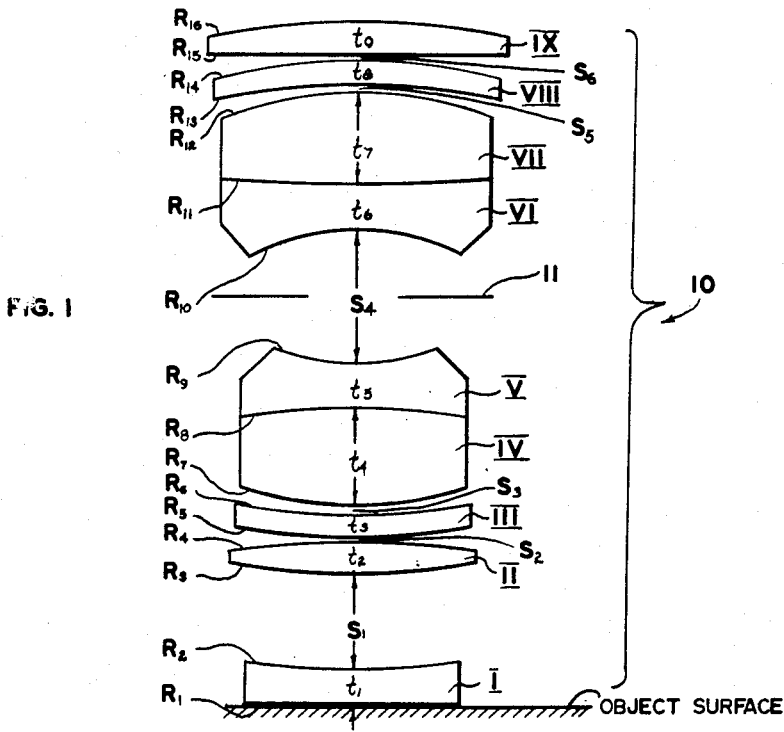

FIG. 1

| E.F.L. = 272.36 | REL. APERT. = f/3.0 | | MAGNIF. = 4.0 x | | |
|---|---|---|---|---|---|
| LENS | FOCAL LGTH. | RADIUS | THICKNESS | SPACES | $n_D$ | $\nu$ |
| I | $F_1 = -602.4$ | $R_1 = \infty$ | $t_1 = 12.30$ | $S_1 = 212.32$ | 1.517 | 64.20 |
| | | $R_2 = 311.43$ | | | | |
| II | $F_2 = 498.8$ | $R_3 = 1185.52$ | $t_2 = 11.50$ | | 1.6204 | 60.29 |
| | | $-R_4 = 416.75$ | | $S_2 = .60$ | | |
| III | $F_3 = 626.6$ | $R_5 = 228.40$ | $t_3 = 11.00$ | | 1.6204 | 60.29 |
| | | $R_6 = 543.99$ | | | | |
| IV | | $R_7 = 144.52$ | $t_4 = 44.17$ | $S_3 = 1.40$ | 1.6204 | 60.29 |
| | $F_4 = -1471.0$ | $-R_8 = 265.67$ | | | | |
| V | | $R_9 = 95.56$ | $t_5 = 16.60$ | | 1.5822 | 42.03 |
| VI | | $-R_{10} = 90.16$ | $t_6 = 16.60$ | $S_4 = 98.38$ | 1.5822 | 42.03 |
| | $F_5 = -1204.8$ | $R_{11} = 612.26$ | | | | |
| VII | | $-R_{12} = 138.90$ | $t_7 = 45.06$ | | 1.6204 | 60.29 |
| | | $-R_{13} = 382.52$ | | $S_5 = 1.40$ | | |
| VIII | $F_6 = 909.4$ | $-R_{14} = 222.92$ | $t_8 = 11.50$ | | 1.5725 | 57.48 |
| IX | $F_7 = 775.2$ | $R_{15} = \infty$ | $t_9 = 12.00$ | $S_6 = .60$ | 1.5725 | 57.48 |
| | | $-R_{16} = 443.87$ | | | | |

FIG. 2

INVENTOR.
MICHAEL J. BUZAWA
BY Frank C. Parker
ATTORNEY 3,190,176
PHOTOGRAPHIC OBJECTIVE FOR USE IN
ENLARGING OR REDUCING DEVICES
Michael J. Buzawa, Rochester, N.Y., assignor to Bausch
 & Lomb Incorporated, Rochester, N.Y., a corporation
 of New York
Filed Nov. 13, 1962, Ser. No. 237,152
7 Claims. (Cl. 88—57)

This invention relates to a photographic objective for use in a photographic enlarger and reducer or similar devices and more particularly relates to such objectives having a relative aperture of about F/3.0.

It is an object of this invention to provide a photographic objective for a photographic enlarger or reducing projector working at about 4.0 magnification, said objective having a relative aperture at least as great as F/3.0, said objective further having optimum correction for spherical and chromatic aberrations as well as astigmatism and flatness of field and distortion in the near ultraviolet region of the spectrum.

It is a further object of this invention to provide a novel photographic objective for an enlarger as above described which utilizes the front lens surface of the objective as a pressure plate to hold the object flat during use.

Further objects and advantages of this invention will appear from a study of the specification hereafter taken in connection with the accompanying drawing in which, FIG. 1 is an optical diagram of a photographic objective constructed according to the present invention, and FIG. 2 is a chart giving the numerical values of the constructional data related to the above mentioned objective.

As shown in FIG. 1 the aforesaid photographic objective is generally designated by the numeral 10 and is composed of a nearly symmetrical sequence of lenses which are grouped about an interposed diaphragm 11, said groups of lenses being proceeded by a negative front lens designated I which optically helps to flatten the field produced by the objective 10. As shown in the drawing, the object to be photographed is located adjacent to the front negative lens as arranged in a photographic enlarger, but the objective 10 may be used as well in a reduction printer or the like in which case the object will be located at the opposite end of the objective 10. The aforesaid front lens I is provided on its front face with a planar surface $R_1$ which in operation of this device is firmly held against an object surface such as a film or sheet of paper to hold said surface flat. On the rear side of said lens I is formed a concave surface $R_2$ which is so constructed relative to the other constructional data of the objective 10 that a flat field is optically provided within a limited specified format which in this case is 2¼″ x 2¼″.

Rearwardly spaced from the front lens I at a distance $S_1$ is a double convex positive lens II followed by a positive single meniscus lens III both of which are singlets and said lenses being spaced apart by a small distance $S_2$. Spaced rearwardly from the meniscus lens III at the distance $S_3$ is a compound lens which is meniscus in form and of negative power, and is composed of a front double convex positive lens element IV which is preferably cemented along an interface $R_8$ to a double concave rear lens element V. Rearwardly and axially spaced therefrom at a distance $S_4$ is a similar negative compound meniscus lens which is composed of a rear double convex positive lens element VII which is preferably cemented to a front double concave lens element VI. The negative meniscus compound lenses lie on opposite sides of an interposed diaphragm 11. Spaced rearwardly at a distance $S_5$ from said compound lenses is another positive meniscus singlet lens VIII having a concave surface $R_{13}$ which faces the diaphragm 11 in the same manner as the concave surface $R_6$ on the positive meniscus singlet lens III. Furthest rearward is provided a singlet positive lens IX at a distance $S_6$ rearwardly from the rear positive meniscus VIII, said rearmost lens having preferably a plano surface $S_{15}$ on its front side. The successive axial thickness $t_1$ to $t_9$ are identified respectively with the aforementioned lens elements I, II, III, IV, V, VI, VII, VIII, and IX.

Constructional data related to the aforesaid objective 10 is so computed and designed as to produce an image of the object which is especially well corrected for spherical and chromatic aberrations as well as tangential and sagittal astigmatism and curvature of field. In order to achieve this condition the focal lengths of the successive optical lens members mentioned above should have numerical values as specified in the table of mathematical statements herebelow, the focal lengths $F_1$ to $F_7$, the related individual lens element thickness $t_1$ to $t_9$, and the axial air spaces $S_1$ to $S_6$ being furthermore given in the same table herebelow, $$2.0F < -F_1 < 2.44F$$
$$1.64F < F_2 < 2.0F$$
$$2.10F < F_3 < 2.56F$$
$$4.86F < -F_4 < 5.94F$$
$$3.98F < -F_5 < 4.86F$$
$$3.00F < F_6 < 3.67F$$
$$2.56F < F_7 < 3.13F$$
$$.0408F < t_1 < .0498F$$
$$.0381F < t_2 < .0465F$$
$$.0364F < t_3 < .0444F$$
$$.1460F < t_4 < .1784F$$
$$.0550F < t_5 < .0672F$$
$$.0550F < t_6 < .0672F$$
$$.1487F < t_7 < .1817F$$
$$.0381F < t_8 < .0465F$$
$$.0399F < t_9 < .0487F$$
$$.701F < S_1 < .857F$$
$$.00200F < S_2 < .00244F$$
$$.00463F < S_3 < .00565F$$
$$.224F < S_4 < .396F$$
$$.00463F < S_5 < .00565F$$
$$.00200F < S_6 - .00244F$$

wherein the minus (—) sign used with the focal length designations denotes negative power and F designates the equivalent focal length of the objective. The compound meniscus lenses are both made of a double convex element and a double concave element in contact with each other, the element IV having a focal length of .578F substantially, the element V having a focal length —.436F, the element VI having a focal length of substantially —.492F, and element VII having a focal length of .687F.

Furthermore the numerical values for the radii of the successive lens elements or parts I to IX should be as specified in the following table of mathematical statements wherein $R_1$ to $R_{16}$ designate the successive lens surfaces numbering from the front of the objective.

$R_1 > \pm 2.0F$
$1.028F < R_2 < 1.256F$
$3.92F < R_3 < 4.80F$
$1.325F < -R_4 < 1.681F$
$.755F < R_5 < .923F$
$1.794F < R_6 < 2.192F$
$.479F < R_7 < .585F$
$.880F < -R_8 < 1.076F$
$.316F < R_9 < .386F$
$.298F < -R_{10} < .364F$
$2.020F < R_{11} < 2.468F$
$.460F < -R_{12} < .562F$
$1.263F < -R_{13} < 1.543F$
$.737F < -R_{14} < .901F$
$R_{15} > \pm 2.0F$
$1.466F < -R_{16} < 1.792F$ wherein the minus (—) sign designates a lens surface whose center of curvature lies on the object side of the vertex of the surface.

Further with reference to the parameters of the objective 10, the refractive index $n_D$ and the Abbe number $\nu$ of the successive lens parts should be specified by the values in the table of mathematical statements herebelow, $1.512 < n_D(I) < 1.522$      $60.0 < \nu(I) < 68.0$
$1.615 < n_D(II) < 1.625$     $55.0 < \nu(II) < 65.0$
$1.615 < n_D(III) < 1.625$    $55.0 < \nu(III) < 65.0$
$1.615 < n_D(IV) < 1.625$     $55.0 < \nu(IV) < 65.0$
$1.577 < n_D(V) < 1.587$      $37.0 < \nu(V) < 47.0$
$1.577 < n_D(VI) < 1.587$     $37.0 < \nu(VI) < 47.0$
$1.615 < n_D(VII) < 1.625$    $55.0 < \nu(VII) < 65.0$
$1.567 < n_D(VIII) < 1.577$   $52.0 < \nu(VIII) < 62.0$
$1.567 < n_D(IX) < 1.577$     $52.0 < \nu(IX) < 62.0$ More specifically the constructional data or parameters for the construction of the objective 10 are specified in the table of mathematical statements given herebelow, the designations having the same meaning as given in the tables hereabove, $-F_1 = 2.210F$           $t_5 = .0611F$
$F_2 = 1.827F$            $t_6 = .0611F$
$F_3 = 2.330F$            $t_7 = .1652F$
$-F_4 = 5.400F$           $t_8 = .0423F$
$-F_5 = 4.420F$           $t_9 = .0443F$
$F_6 = 3.340F$            $S_1 = .779F$
$F_7 = 2.845F$            $S_2 = .00222F$
$t_1 = .0453F$            $S_3 = .00514F$
$t_2 = .0423F$            $S_4 = .360F$
$t_3 = .0404F$            $S_5 = .00514F$
$t_4 = .1622F$            $S_6 = .00222F$ $R_1 = \infty$            $t_1 = .0453F$
$R_2 = 1.142F$            $t_2 = .0423F$
$R_3 = 4.36F$             $t_3 = .0404F$
$-R_4 = 1.528F$           $t_4 = .1622F$
$R_5 = .839F$             $t_5 = .0611F$
$R_6 = 1.993F$            $t_6 = .0611F$
$R_7 = .532F$             $t_7 = .1652F$
$-R_8 = .978F$            $t_8 = .0423F$
$R_9 = .351F$             $t_9 = .0443F$
$-R_{10} = .331F$         $S_1 = .779F$
$R_{11} = 2.244F$         $S_2 = .00222F$
$-R_{12} = .511F$         $S_3 = .00514F$
$-R_{13} = 1.403F$        $S_4 = .360F$
$-R_{14} = .819F$         $S_5 = .00514F$
$R_{15} = \infty$         $S_6 = .00222F$
$-R_{16} = 1.629F$
$n_D(I) = 1.517$          $\nu(I) = 64.20$
$n_D(II) = 1.6204$        $\nu(II) = 60.29$
$n_D(III) = 1.6204$       $\nu(III) = 60.29$
$n_D(IV) = 1.6204$        $\nu(IV) = 60.29$
$n_D(V) = 1.5822$         $\nu(V) = 42.03$
$n_D(VI) = 1.5822$        $\nu(VI) = 42.03$
$n_D(VII) = 1.6204$       $\nu(VII) = 60.29$
$n_D(VIII) = 1.5725$      $\nu(VIII) = 57.48$
$n_D(IX) = 1.5725$        $\nu(IX) = 57.48$ The constructional data for one successful form of the present invention is given in the chart herebelow and in FIG. 2 of the drawing wherein E.F.L. designates the equivalent focal length of the objective and the scalar values are given in millimeters, the designations for the various parameters being the same as given in the foregoing tables.

[E.F.L. = 272.36.  $f/3.0$.  Magnif. = 4.0×]

| Lens | Focal Length | Radii | Thicknesses | Spaces | $n_D$ | $\nu$ |
|------|--------------|-------|-------------|--------|-------|-------|
| I    | $F_1 = -602.4$ | $R_1 = \infty$ | $t_1 = 12.30$ |  | 1.5170 | 64.20 |
|      |              | $R_2 = 311.43$ |  | $S_1 = 212.32$ |  |  |
| II   | $F_2 = 498.8$ | $R_3 = 1,185.32$ | $t_2 = 11.50$ |  | 1.6204 | 60.29 |
|      |              | $-R_4 = 416.75$ |  | $S_2 = .60$ |  |  |
| III  | $F_3 = 626.6$ | $R_5 = 228.40$ | $t_3 = 11.00$ |  | 1.6204 | 60.29 |
|      |              | $R_6 = 543.99$ |  | $S_3 = 1.40$ |  |  |
| IV   | $F_4 = -1,471.0$ | $R_7 = 144.52$ | $t_4 = 44.17$ |  | 1.6204 | 60.29 |
| V    |              | $-R_8 = 265.67$ | $t_5 = 16.60$ |  | 1.5822 | 42.03 |
|      |              | $R_9 = 95.56$ |  | $S_4 = 98.38$ |  |  |
| VI   | $F_5 = -1,204.8$ | $-R_{10} = 90.16$ | $t_6 = 16.60$ |  |  |  |
| VII  |              | $R_{11} = 612.26$ | $t_7 = 45.06$ |  | 1.6204 | 60.29 |
|      |              | $-R_{12} = 138.90$ |  | $S_5 = 1.40$ |  |  |
| VIII | $F_6 = 909.4$ | $-R_{13} = 382.52$ | $t_8 = 11.50$ |  | 1.5725 | 57.48 |
|      |              | $-R_{14} = 222.92$ |  | $S_6 = .60$ |  |  |
| IX   | $F_7 = 775.2$ | $R_{15} = \infty$ | $t_9 = 12.00$ |  | 1.5725 | 57.48 |
|      |              | $-R_{16} = 443.87$ |  |  |  |  |

Although only one specific form of this invention has been shown and described in detail it will be understood that other forms and arrangements are possible and changes may be made in the relative numerical values of the optical parameters without departing from the spirit of the invention as defined in the claims herebelow.

I claim:

1. A photographic objective for photographic enlarging or reducing devices having a relative aperture of substantially $f/3.0$ said objective comprising in optical alignment a negative field flattening lens located nearest to the objective, a pair of positive singlet lenses spaced rearwardly thereof in optical alignment with the first lens, a pair of mutually spaced negative meniscus lenses arranged concave to each other on opposite sides of an interposed diaphragm and rearwardly spaced from said positive lenses, and a second pair of singlet positive lenses rearwardly spaced from and optically aligned with said negative lenses, said successive lenses having focal lengths which are designated $F_1$ to $F_7$ and having axial thicknesses $t_1$ to $t_7$ axial spacings $S_1$ to $S_6$, and refractive index $n_D$ and Abbe number $v$ of the glass from which said lenses are made which are specified numerically in the table of mathematical statements herebelow, $2.0F < -F_1 < 2.44F$
$1.64F < F_2 < 2.0F$
$2.10 < F_3 < 2.56F$
$4.86F < -F_4 < 5.94F$
$3.98F < -F_5 < 4.86F$
$3.00F < F_6 < 3.67F$
$2.56F < F_7 < 3.13F$
$.0408F < t_1 < .0498F$
$.0381F < t_2 < .0465F$
$.0364F < t_3 < .1784F$
$.0550F < t_4 < .0672$
$.0550F < t_5 < .0672F$
$.1487F < t_6 < .1817F$
$.0381F < t_7 < .0465F$
$.0399F < t_8 < .0487F$
$.701F < S_1 < .857F$
$.00200F < S_2 < .00244F$
$.00463F < S_3 < .00565F$
$.244F < S_4 < .396F$
$.00463F < S_5 < .00565F$
$.00200F < S_6 < .00244F$ wherein the minus (—) sign designates lenses of negative power and F designates the equivalent focal length of the objective.

2. A photographic objective for photographic enlarging or reducing devices having substantially four times magnification and a relative aperture of at least $f/3.0$, said objective comprising in optical alignment
    a front plano concave lens having its plano surface located on the object side thereof and designated I,
    a pair of collective lenses designated II and III optically aligned in spaced relation to each other and spaced rearwardly from lens I,
    a front compound meniscus lens including a front positive element designated IV and a contiguous rear negative element designated V,
    a rear compound meniscus lens including a front negative element which is designated VI and a contiguous positive rear element designated VII, said front and rear compound lenses each having a concave surface which faces and is spaced from an interposed diaphragm, and
    a pair of collective lenses which are designated VIII and IX and are spaced from each other and are spaced rearwardly from said rear compound lens,
    the above identified successive lenses having values of focal lengths $F_1$ to $F_7$ as specified in the table of mathematical statements given herebelow, $2.0F < F_1$(lens I) $< 2.44F$
$1.64F < F_2$(lens II) $< 2.0F$
$2.10F < F_3$(lens III) $< 2.56F$
$4.86F < F_4$(elements IV, V) $< 5.94F$
$3.98F < F_5$(elements VI, VII) $< 4.86F$
$3.00F < F_6$(lens VIII) $< 3.67F$
$2.56F < F_7$(lens IX) $< 3.13F$ wherein the minus (—) sign denotes negative power, the successive axial thicknesses $t_1$ to $t_9$ and lens spacings $S_1$ to $S_6$ being specified in the table of mathematical statements herebelow, $.0408F < t_1 < .0498F$
$.0381F < t_2 < .0465F$
$.0364F < t_3 < .0444F$
$.1460F < t_4 < .1784F$
$.0550F < t_5 < .0672F$
$.0550F < t_6 < .0672F$
$.1487F < t_7 < .1817F$
$.0381F < t_8 < .0465F$
$.0399F < t_9 < .0487F$
$.701F < S_1 < .857F$
$.00200F < S_2 < .00244F$
$.00463F < S_3 < .00565F$
$.244F < S_4 < .396F$
$.00463F < S_5 < .00565F$
$.00200F < S_6 < .00244F$ the values of the refractive index $n_D$ and Abbe number $v$ of the successive lens parts being specified in the table of mathematical statements given herebelow, $1.512 < n_D(I) < 1.522$   $60.0 < v(I) < 68.0$
$1.615 < n_D(II) < 1.625$   $55.0 < v(II) < 65.0$
$1.615 < n_D(III) < 1.625$   $55.0 < v(III) < 65.0$
$1.615 < n_D(IV) < 1.625$   $55.0 < v(IV) < 65.0$
$1.577 < n_D(V) < 1.587$   $37.0 < v(V) < 47.0$
$1.577 < n_D(VI) < 1.587$   $37.0 < v(VI) < 47.0$
$1.615 < n_D(VII) < 1.625$   $55.0 < v(VII) < 65.0$
$1.567 < n_D(VIII) < 1.577$   $52.0 < v(VIII) < 62.0$
$1.567 < n_D(IX) < 1.577$   $52.0 < v(IX) < 62.0$ and wherein F designates the equivalent focal length of said objective.

3. A photographic objective for photographic enlarging or reducing devices having a relative aperture of at least $f/3.0$, said objective comprising
    a front plano concave lens in which the plano surface is located on the object side thereof and the lens being designated I,
    a pair of successively arranged collective lenses designated II and III and spaced from each other and spaced rearwardly from the plano-concave lens,
    a front compound negative meniscus lens including a front positive element IV and a contiguous rear negative element V,
    a rear compound negative meniscus lens including a front negative element VI and a rear contiguous positive element VII, said front and rear compound lenses each having a concave surface which faces and is spaced from an interposed diaphragm, and
    a pair of successively arranged collective lenses which are designated VIII and IX and are spaced from each other and spaced rearwardly from said rear compound lens,
    the successive lenses having focal lengths $F_1$ to $F_7$ related respectively to lenses I, II, III, IV–V, VI–VII, VIII and IX as specified in the table of values given herebelow, $-F_1 = 2.210F$
$F_2 = 1.827F$
$F_3 = 2.330F$
$-F_4 = 5.400F$
$-F_5 = 4.420F$
$F_6 = 3.340F$
$F_7 = 2.845F$ where the minus (—) sign signifies negative power and F denotes the equivalent focal length of the objective, the successive values of axial lens thicknesses $t_1$ to $t_9$ of the successive lens elements and lens spacings $S_1$ to $S_6$ being given in the table of mathematical statements herebelow, $t_1 = .0453F$      $t_9 = .0443F$
$t_2 = .0423F$      $S_1 = .779F$
$t_3 = .0404F$      $S_2 = .00222F$
$t_4 = .1622F$      $S_3 = .00514F$
$t_5 = .0611F$      $S_4 = .360F$
$t_6 = .0611F$      $S_5 = .00514F$
$t_7 = .1652F$      $S_6 = .00222F$
$t_8 = .0423F$ wherein F designates the equivalent focal length of said objective.

4. A photographic objective as set forth in claim 2 wherein the focal lengths of said lens elements are as stated herebelow, Element IV=.578F
Element V=—.436F
Element VI=—.492F
Element VII=.687F 5. A photographic objective for photographic enlarging or reducing devices having a relative aperture of at least $f/3.0$, said objective comprising
a front plano concave lens in which the plano surface is located on the object side thereof and the lens being designated I,
a pair of collective lenses designated II and III successively arranged and being spaced from each other and spaced rearwardly from the plano-concave lens,
a front compound meniscus negative lens including a front positive element IV and a contiguous rear negative element V,
a rear compound meniscus negative lens including a front negative element VI and a contiguous rear positive element VII, said front and rear compound lenses each having a concave surface which faces and is spaced from an interposed diaphragm, and
a pair of collective lenses which are designated VIII and IX and are spaced from each other and spaced rearwardly from said rear compound lens,
the objective having constructional data as specified in the table of mathematical statements given herebelow wherein $R_1$ to $R_{16}$ represent the radii of the successive lens surfaces, $t_1$ to $t_9$ represent the successive axial lens thicknesses, $S_1$ to $S_6$ represent the axial interlens spaces, $n_D$ and $\nu$ represent respectively the refractive index and the Abbe number of the respective lens materials, and F denotes the equivalent focal length of the objective, $R_1$=Plano
$1.028F<R_2<1.256F$
$3.92F<R_3<4.80F$
$1.325F<-R_4<1.681F$
$.755F<R_5<.923F$
$1.794F<R_6<2.192F$
$.479F<R_7<.585F$
$.880F<-R_8<1.076F$
$.316F<R_9<.386F$
$.298F<-R_{10}<.364F$
$2.020F<R_{11}<2.468F$
$.460F<-R_{12}<.562F$
$1.263F<-R_{13}<1.543F$
$.737F<-R_{14}<.901F$
$R_{15}>\pm2.0F$
$1.466F<-R_{16}<1.792F$ wherein the minus (—) sign designates a lens surface whose center of curvature lies on the object side of the vertex of the surface, $.0408F<t_1<.0498F$
$.0381F<t_2<.0465F$
$.0364F<t_3<.0444F$
$.1460F<t_4<.1784F$
$.0550F<t_5<.0672F$
$.0550F<t_6<.0672F$
$.1487F<t_7<.1817F$
$.0381F<t_8<.0465F$
$.0399F<t_9<.0487F$
$.701F<S_1<.857F$
$.00200F<S_2<.0024F$
$.00463F<S_3<.00565F$
$.224F<S_4<.396F$
$.00463F<S_5<.00565F$
$.00200F<S_7<.00244F$
$1.512<n_D(I)<1.522$
$1.615<n_D(II)<1.625$
$1.615<n_D(III)<1.625$
$1.615<n_D(IV)<1.625$
$1.577<n_D(V)<1.587$
$1.577<n_D(VI)<1.587$
$1.615<n_D(VII)<1.625$
$1.567<n_D(VIII)<1.577$
$1.567<n_D(IX)<1.577$
$60.0<\nu(I)<68.0$
$55.0<(II)\nu<65.0$
$55.0<\nu(III)<65.0$
$55.0<\nu(IV)<65.0$
$37.0<\nu(V)<47.0$
$37.0<\nu(VI)<47.0$
$55.0<\nu(VII)<65.0$
$52.0<\nu(VIII)<62.0$
$52.0<\nu(IX)<62.0$ 6. A photographic enlarging or reducing objective having a relative aperture of at least $f/3.0$ and magnification of substantially 4×, said objective comprising
a front plano concave lens in which the plano surface is located on the object side thereof and the lens being designated I,
a pair of collective lenses designated II and III successively arranged and being spaced from each other and spaced rearwardly from the plano-concave lens,
a front compound meniscus negative lens including a front positive element IV and a contiguous rear negative element V,
a rear compound meniscus negative lens including a front negative element VI and a contiguous rear positive element VII, said front and rear compound lenses each having a concave surface which faces and is spaced from an interposed diaphragm, and
a pair of collective lenses which are designated VIII and IX and are spaced from each other and spaced rearwardly from said rear compound lens,
the objective having constructional data as specified in the table of mathematical statements given herebelow wherein $R_1$ to $R_{16}$ represent the radii of the successive lens surfaces, $t_1$ to $t_9$ represent the axial lens thicknesses, $S_1$ to $S_6$ represent the axial interlens spaces, $n_D$ and $\nu$ represent respectively the refractive index and the Abbe number of the respective lens materials, and F denotes the equivalent focal length of the objective, $R_1=\infty$
$R_2=1.142F$
$R_3=4.36F$
$-R_4=1.528F$
$R_5=.839F$
$R_6=1.993F$
$R_7=.532F$
$-R_8=.978F$
$R_9=.351F$
$-R_{10}=.331F$
$R_{11}=2.244F$
$-R_{12}=.511F$
$-R_{13}=1.403F$
$-R_{14}=.819F$
$R_{15}=\infty$
$-R_{16}=1.629F$ $t_1=.0453F$
$t_2=.0423F$
$t_3=.0404F$
$t_4=.1622F$
$t_5=.0611F$
$t_6=.0611F$
$t_7=.1652F$
$t_8=.0423F$
$t_9=.0443F$
$S_1=.779F$
$S_2=.00222F$
$S_3=.00514F$
$S_4=.360F$
$S_5=.00514F$
$S_6=.00222F$ $n_D(I)=1.517$
$n_D(II)=1.6204$
$n_D(III)=1.6204$
$n_D(IV)=1.6204$
$n_D(V)=1.5822$
$n_D(VI)=1.5822$
$n_D(VII)=1.6204$
$n_D(VIII)=1.5725$
$n_D(IX)=1.5725$ $\nu(I)=64.20$
$\nu(II)=60.29$
$\nu(III)=60.29$
$\nu(IV)=60.29$
$\nu(V)=42.03$
$\nu(VI)=42.03$
$\nu(VII)=60.29$
$\nu(VIII)=57.48$
$\nu(IX)=57.48$ wherein the minus (—) sign designates a lens surface whose center of curvature lies on the object side of the vertex of said surface.

7. An objective for a photographic enlarger or reducer comprising a front field flattening lens of negative power, two positive lenses spaced from each other adjacent the opposite ends of said objective and spaced in optical alignment rearwardly of said front lens, two positive meniscus lenses spaced between and individually adjacent to the first said positive lenses with their concave sides facing each other, and a pair of compound negative meniscus lenses spaced apart from each other on opposite sides of an interposed diaphragm and located between said positive meniscus lenses, the constructional data therefor being given in the chart of values herebelow wherein $R_1$ to $R_{16}$ designate radii of the successive lens surfaces numbering from the front of the objective, $t_1$ to $t_9$ denote the successive axial lens thicknesses, $S_1$ to $S_6$ designate the successive airspaces, and $n_D$ and $\nu$ represent respectively the refractive index and Abbe number of the glasses from which said lenses are made, the minus (—) sign used with the R values applies to the radius of a surface whose center of curvature lies on the object side of the vertex of the surface,

[E.F.L.=272.36.   f/3.0.   Magnif.=4.0×]

| Lens | Focal Length | Radii | Thicknesses | Spaces | $n_D$ | $\nu$ |
|---|---|---|---|---|---|---|
| I | $F_1=-602.4$ | $R_1=\infty$ | $t_1=12.30$ | | 1.5170 | 64.20 |
| | | $R_2=311.43$ | | $S_1=212.32$ | | |
| II | $F_2=498.8$ | $R_3=1,185.32$ | $t_2=11.50$ | | 1.6204 | 60.29 |
| | | $-R_4=416.75$ | | $S_2=.60$ | | |
| III | $F_3=626.6$ | $R_5=228.40$ | $t_3=11.00$ | | 1.6204 | 60.29 |
| | | $R_6=543.99$ | | $S_3=1.40$ | | |
| IV | $F_4=-1,471.0$ | $R_7=144.52$ | $t_4=44.17$ | | 1.6204 | 60.29 |
| | | $-R_8=265.67$ | | | | |
| V | | $R_9=95.56$ | $t_5=16.60$ | | 1.5822 | 42.03 |
| | | | | $S_4=98.38$ | | |
| VI | $F_5=-1,204.8$ | $-R_{10}=90.16$ | $t_6=16.60$ | | | |
| | | $R_{11}=612.26$ | | | 1.6204 | 60.29 |
| VII | | $-R_{12}=138.90$ | $t_7=45.06$ | | | |
| | | | | $S_5=1.40$ | | |
| VIII | $F_6=909.4$ | $-R_{13}=382.52$ | $t_8=11.50$ | | 1.5725 | 57.48 |
| | | $-R_{14}=222.92$ | | $S_6=.60$ | | |
| IX | $F_7=775.2$ | $R_{15}=\infty$ | $t_9=12.00$ | | 1.5725 | 57.48 |
| | | $-R_{16}=443.87$ | | | | |

All scalar values being given in millimeters.

No references cited.

JEWELL H. PEDERSEN, *Primary Examiner.*

JOHN K. CORBIN, FREDERICK M. STRADER, *Examiners.*

UNITED STATES PATENT OFFICE
CERTIFICATE OF CORRECTION

Patent No. 3,190,176                                                     June 22, 1965

Michael J. Buzawa

It is hereby certified that error appears in the above numbered patent requiring correction and that the said Letters Patent should read as corrected below.

Column 2, line 13, for "$S_{15}$" read -- $R_{15}$ --; same line 13 and line 25, for "thickness", each occurrence, read -- thicknesses --; column 3, line 23, after "values" insert -- given --; column 4, line 75, after "the" insert -- object end o: the --; column 5, line 32, for ".244F" read -- .224F --; line 6. for "$F_1$" read -- $-F_1$ --; line 67, for "$F_4$" read -- $-F_4$ --; line 68, for "$F_5$" read -- $-F_5$ --; same column 5, line 74, after "being" insert -- as --; column 6, line 5, for ".244F" read -- .224F --; column 7, line 68, for ".0024F" read -- .00244F --; line 72, for "$S_7$" read -- $S_6$ --.

Signed and sealed this 23rd day of November 1965.

(SEAL)
Attest:

ERNEST W. SWIDER                                       EDWARD J. BRENNER
Attesting Officer                                    Commissioner of Patents